Dec. 25, 1951  E. L. PRIZER  2,579,859
APPARATUS FOR SUPPLYING SOLID MATERIAL TO LIQUIDS
Filed April 29, 1949  2 SHEETS—SHEET 1
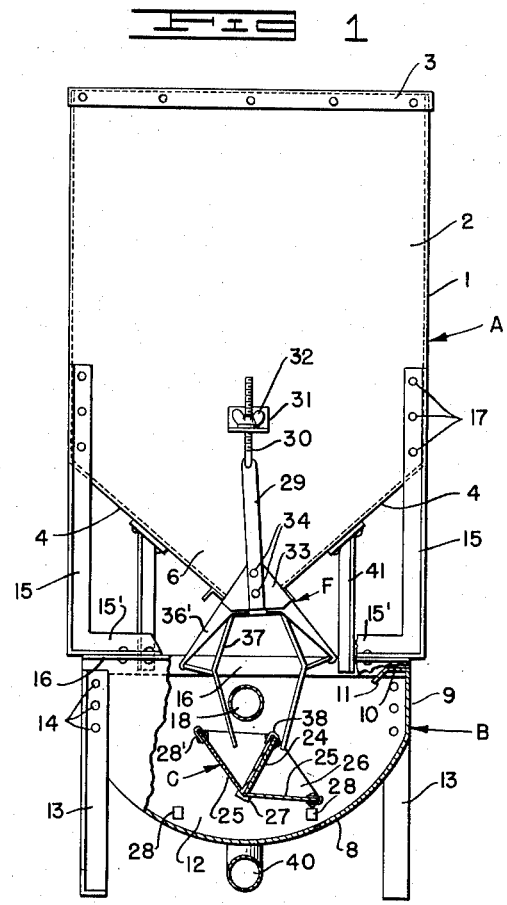
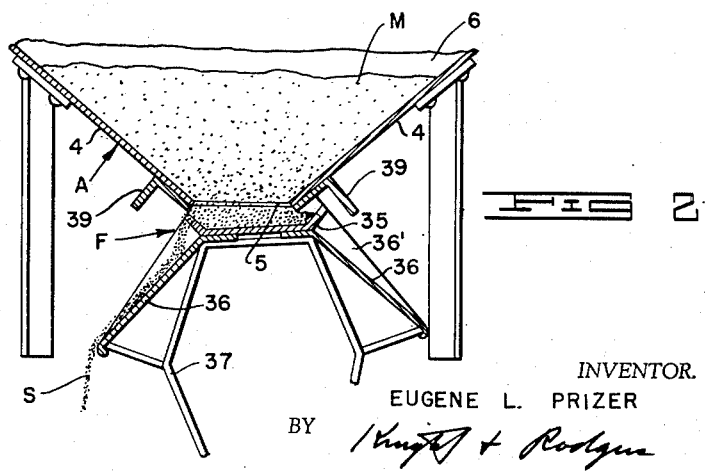
INVENTOR.
EUGENE L. PRIZER
BY *Knight & Rodgers*
ATTORNEY.

Dec. 25, 1951 E. L. PRIZER 2,579,859
APPARATUS FOR SUPPLYING SOLID MATERIAL TO LIQUIDS
Filed April 29, 1949 2 SHEETS—SHEET 2
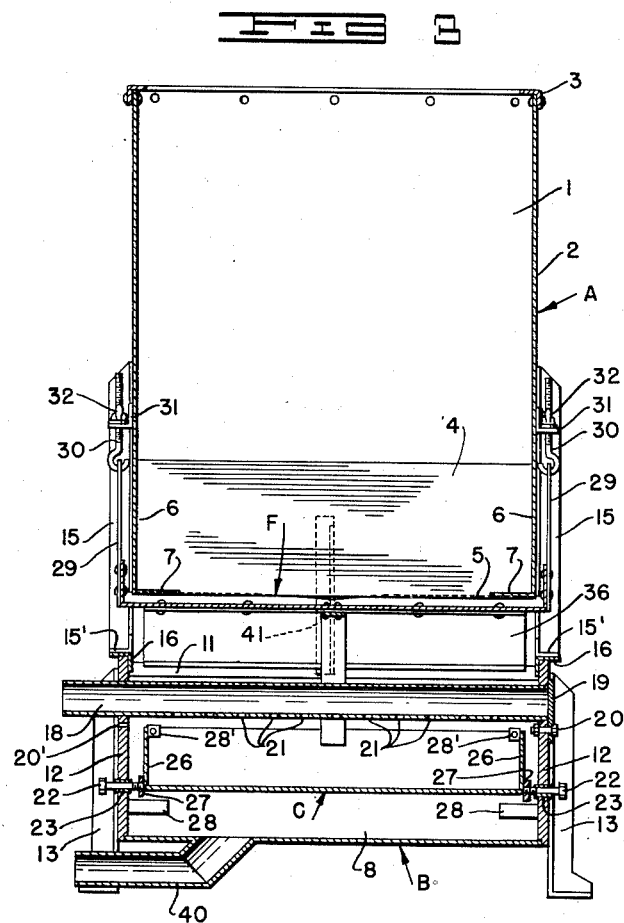
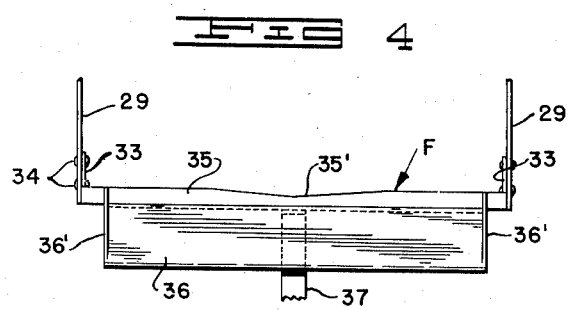
INVENTOR.
EUGENE L. PRIZER
BY
ATTORNEY.

Patented Dec. 25, 1951

2,579,859

UNITED STATES PATENT OFFICE 2,579,859

APPARATUS FOR SUPPLYING SOLID MATERIAL TO LIQUIDS

Eugene L. Prizer, Escondido, Calif., assignor of one-fourth to Murray Ferguson, Compton, Calif., and one-fourth to John A. Prizer, Fullerton, Calif.

Application April 29, 1949, Serial No. 90,404

8 Claims. (Cl. 259—11)

This invention relates to an apparatus for supplying solid treatment material to liquids and is particularly concerned with an apparatus for the introduction of soil-treating agents to irrigation water for agricultural projects. While the invention is broadly applicable to the introduction of various, more or less soluble, solid treatment materials of widely varying types, for the treatment of equally widely varying liquids, it is particularly adapted for the introduction of solid particles of material of relatively low solubility, such as gypsum, into constantly flowing soil irrigation water.

One of the principal objects of the invention is to provide for the introduction of solid particles of treatment material at a rate proportionate to the supply of liquid to be treated. While such proportionate supply of treatment material is generally desirable in the treatment of any liquid regardless of the solubility of such material it is particularly desirable in the treatment of liquids with particles of slowly soluble material or where the material supplied is in excess of that required for a saturation of the liquid supplied to the apparatus. A disproportionate supply of such material will produce a build-up of material within the apparatus which would render the discharged liquid non-uniform in character and would result in a waste of material and the choking or clogging of valves, passage ways, and moving parts of the mixing apparatus and associated equipment.

Another important object is to provide an apparatus of the character described by which the proportionate supply of treatment material to the liquid may be readily varied to conform with widely varying demands. Where the treatment material is of relatively high solubility, it may be expedient to supply relatively large proportions of such material to the liquid, while with a less soluble material as for instance gypsum which is to be suspended in the liquid the proportion of treatment material supplied will generally be less than with the use of the more soluble materials. Readily adjustable means for varying the proportionate supply is essential to a broad scope of utility.

An equally important object is to provide an apparatus for proportionate treatment material supply which will remain constant regardless of fluctuations in the rate of liquid supply to the end that the predetermined proportionate application of the treatment material will not vary in response to variations in liquid flow. In agricultural projects it is frequently impractical to accurately control the rate of flow of irrigation water. This is particularly true in open ditch irrigation where the supply is dependent upon uncontrollable factors, as for instance the head of water available, the number of ditches supplied, and periodic rainfall. The present invention provides for a uniform application of proportionate quantities of treatment material regardless of the rate of flow of the liquid, and also provides for control of the rate of supply of the treatment material and liquid by regulating the flow of liquid to the apparatus.

It is also an object of the invention to provide for a uniform dispersal or scattering of treatment material in the liquid so that for each small unit of volume of liquid there is deposited a predetermined proportionately small increment of the treatment material, as distinguished from a method or apparatus in which a large proportionate quantity of treatment material is deposited as a relatively confined mass in a proportionately large volume of liquid. In the latter case agitation must be depended upon as the sole means for insuring a uniform distribution of the treatment material throughout the liquid.

A further object is to supply proportionate increments of solid treatment material to individual quantities of the liquid treated, so that each such quantity will be provided with an individual proportionate increment of the solid material with which it is to be treated. While such procedure provides for a substantially step-by-step treatment of the individual quantities of the liquid, the procedure nevertheless admits of a continuous supply of liquid to the apparatus and a more or less continuous flow of treated liquid from the apparatus. In considering this object of the invention, it may be borne in mind that while in some instances this treatment material may be wholly and quite rapidly dissolved within the liquid the invention contemplates the suspension of undissolved particles of the treatment material in the liquid for subsequent complete dissolution after the liquid has left the apparatus and joined a larger body of liquid, such as a stream of irrigation water. With materials of low solubility, the increment feeding of the material to individual portions of the liquid is highly important in order to effect the distribution of suspended particles in a uniform manner.

A further object is to provide for the successive delivery of small increments of treating material from a bed or column of such material, for agitation with and dispersion in a liquid, in such manner as to avoid contact of the liquid with the material in the bed or column. By discharging the dry material by gravity from the bottom of the bed or column, and thereafter bringing the discharged material into agitating contact with the liquid, the material in the bed or column is retained in dry, free-flowing condition so that it will be discharged readily by gravity and the material in the upper portion will fall readily and freely to the bottom of the bed or column to position for discharge. Keeping the material in the bed or column dry avoids any difficulty due to the tendency of certain materials to cake or agglomerate in the presence of moisture.

Another object is to provide for mechanically jarring or agitating the bed of material to promote uniform and complete discharge thereof.

A number of practical advantages are inherent in carrying out the agitation and suspension in an open receptacle having free communication with the surrounding environment. Such advantages include the ready inspection of the liquid during the administration of the treatment material and the agitation thereof, and accessibility for cleaning and repairs. A further object of the present invention is to provide for the application of treatment material and agitation of the liquid therewith in an open receptacle. A companion object is to provide open agitation in such manner as to preclude splashing and loss of liquid and treating material.

Further objects and advantages of my invention will be pointed out hereinafter or will be apparent from the following description.

In the apparatus of my invention, I provide for an automatic division of the inflowing liquid into separate, periodically flowing, oppositely directed, elongated sheets of predetermined volume and as an incident to such flow, I provide for the delivery of predetermined increments of treatment material as elongated layers or bands periodically deposited so that the liquid sheets will flow out upon the previously deposited thin layer of treatment material in such manner as to provide for the uniform contacting of small volumes of liquid with small increments of the treatment material. I also provide for a forcible contact of the liquid with the material whereby they are vigorously agitated to provide a homogeneous suspension of the material in the liquid. A characteristic of the invention is to provide a vigorous surging motion of the liquid in contact with the material to provide further vigorous agitation. In providing such an apparatus, simplicity of construction and economy of manufacture have been incorporated into the design without sacrifice of strength, durability, efficiency, or effectiveness.

In the accompanying drawings illustrating a preferred embodiment of the apparatus in accordance with this invention:

Fig. 1 is an end elevation partly broken away showing a preferred form of the apparatus;

Fig. 2 is a vertical detailed transverse section illustrating the feed means for the solid treatment material;

Fig. 3 is a vertical central longitudinal section of the apparatus shown in Fig. 1; and Fig. 4 is a side elevation of the material feed means.

In general terms the apparatus of the present invention may be defined as comprising a material hopper A supported in spaced vertical position over a relatively open agitation basin B, together with a liquid supply means for the basin and a material feed means operable as an incident to the flow of liquid to the basin for discharging material from the hopper into the basin, and a discharge outlet for the material laden liquid.

In the drawings the hopper A is disclosed as substantially rectangular in horizontal cross section having vertical side and end walls 1 and 2 respectively. The upper end of the hopper may be provided with a flanged stiffening member 3 secured to the upper edges of the side and end walls. The bottom of the hopper is formed by inwardly slanted walls 4 constituting downwardly and inwardly inclined extensions of the lower portions of the side walls 1. As will be more clearly noted in Fig. 2 of the drawings, the inwardly inclined walls 4, of the bottom, terminate short of the longitudinal center of the hopper to form an elongated central longitudinally extending hopper discharge opening 5 at the bottom of the hopper. The walls 4 are shown as provided with stiffening members such as angle bars 39 secured thereto externally adjacent the opening 5.

The end walls 2 of the hopper are formed at their lower ends with tapering sections 6 which conform with the inward inclination of the walls 4 of the bottom to which the side edges of the portion 6 are joined. Each portion 6 is provided with an inwardly turned extension forming a shoulder 7 conforming in width to the width of the opening 5 and forming terminal plates defining the limits of the longitudinal extension of the opening 5 whereby the terminal ends of the opening 5 are inwardly spaced from the end wall portion 6. While the invention is not limited to the structural details of the hopper as here shown, it is suggested that the hopper may be conveniently made from a single sheet of relatively heavy gauge aluminum bent to provide the four walls and the shoulders 7 as well as the bottom walls 4, and suitably secured by riveting or welding as expediency may direct.

The agitation basin B is mounted centrally under and extending longitudinally with the hopper opening 5 and includes a semi-circularly curved longitudinally extending body which may be conveniently formed from sheet aluminum of a similar or slightly heavier gauge than the sheet forming the hopper. The basin body is formed to provide a longitudinally extending curved central floor 8 from the edges of which extend vertical side wall 9. The upper terminal edges of walls 9 are turned inwardly to form longitudinally extending inwardly directed splash flanges 10 which terminate in downwardly and inwardly directed splash guards 11. An outlet pipe 40 extends from the lower portion of the body to provide a gravity discharge of the liquid from the basin after treatment.

The basin body is mounted on and secured to a pair of identical basin end plates 12, to the bottom and side edges of which the basin body may be secured by welding or the like. As will be noted from Fig. 3, the end plates 12 are spaced apart by the extent of the basin body and are vertically disposed in parallel planes closely adjacent but outwardly disposed from the planes of the end walls 2 of the hopper. The plates 12 are of relatively thick material and may conveniently be formed by castings of aluminum or equivalent material and are supported by four corner legs 13 which may be conveniently formed of angle iron to which the plates 12 may be riveted as indicated by the bolts 14 of Fig. 1. The plates 12 supported from the legs 13 not only provide for the mounting of the basin body but likewise removably support the hopper in its central longitudinally disposed relation to the basin by the provision of four L-shaped corner supporting brackets 15. The lower, inwardly extending legs 15' of the brackets 15 are secured to angle bars 16 which rest upon the top surfaces of the end plates 12, while the elongated side legs extend upwardly therefrom to be secured to the end walls 2 of the hopper as by the bolts or rivets 17 as shown in Fig. 1.

Liquid to be treated is admitted to the basin body by an inlet conduit or pipe 18. The pipe 18 is shown as an open-ended tube extending through both of the end plates 12. The inlet end of the tube or pipe 18 preferably projects beyond its supporting end plate 12 as shown to the left in Fig. 3. The opposite end of the pipe 18 is provided with a closure plate 19 secured thereto as by welding and detachably connected to the outer face of the opposite end plate 12 by means of a securing bolt 20. The extended inlet portion of the conduit 18 provides for the securement thereto of a suitable liquid supply means such as a pipe or hose. It will be noted that each end plate 12 is provided with a hole 20' for receiving the bolt 20, so that the conduit 18 may be readily removed and reversed in position if desired. Within the confines of the end plates 12, the tube 18 is provided with a plurality of equally spaced, downwardly opening, liquid discharge apertures 21 from which the liquid to be treated is continuously emitted as a downwardly directed, longitudinally extending, vertical curtain.

Mounted within the basin B and pivotally supported upon a pair of inwardly extending trunnions 22, which extend through the plates 12, supported in bearing 23, there is provided a feed actuating and liquid dividing bucket or dipper indicated generally at C. The bucket comprises an elongated longitudinally extending pair of substantially V-shaped bucket elements 24. The inner side legs of the elements 24 are joined to form a single longitudinally extending central wall 24 from the lower edge of which the outer legs 25 extend to form a pair of upwardly directed open mouthed buckets. The end walls 26 of the bucket elements are provided adjacent the apex thereof with trunnion-engaging blocks 27 by which the bucket is mounted on the trunnions 22 for limited free oscillating movement within the basin body. The outer ends of the side walls 25 of the bucket may be provided with stop-engaging wear pads 28' positioned to engage stop members 28 at oppositely spaced points on the inner face of the end plates 12 so as to limit the oscillating movements of the bucket.

It will be noted that the buckets are mounted centrally of the basin body and thus directly under the apertures 21 of the supply pipe 18 and are thus positioned to alternately receive the direct flow of liquid from the pipe. With the bucket as shown in the clockwise pivoted position indicated in Fig. 1, the left-hand bucket will receive the full flow of liquid until such time as the accumulated weight of liquid therein overcomes the weight of the right-hand bucket, whereupon such weight will tilt the bucket in counterclockwise direction to discharge the liquid accumulated in the left-hand bucket and to position the right-hand bucket to receive the continuous flow of liquid, until it in turn has over-weighted the left-hand bucket and the oscillation is reversed.

By this arrangement it will be seen that in response to a continuous flow of liquid through the conduit 18, the bucket will divide such continuous flow into individual separately discharged volumes of liquid to be treated and will alternately discharge such measured volumes at opposite sides of the basin body. Since the buckets extend longitudinally within the basin body and since the upper edges of both buckets are straight lines parallel to the axis upon which the bucket is oscillated, it will be seen that the liquid discharged or spilled from the bucket edges as they successively rock back and forth will be discharged as a thin elongated sheet of liquid. It will be noted that in the successive rocking actions of the bucket the sheets of liquid will successively surge upwardly and downwardly on either side of the basin body in such manner that the successive quantities of liquid will surge back and forth in the basin several times, with consequent vigorous agitation, before flowing out through outlet pipe 40.

The oscillations of the bucket provide for a timed and sequential measured discharge of increments of the treating material by applying as an incident to the oscillation thereof a responsive oscillation to a material feeding mechanism. The feed mechanism includes a longitudinally extending feed tray F which is disposed beneath the hopper discharge opening 5 and supported by end engagement with supporting links 29 adjustably and rockably supported from threaded hooks 30 carried by angle brackets 31 mounted upon and extending outwardly from the opposite ends 2 of the hopper. The hooks 30 are secured in the brackets 31 by readily adjustable wing nuts 32 by which their vertical position may be altered so as to vary the height of the links 29 and thus the spacing of the feed tray F with respect to the opening 5 of the hopper. By such adjustment the quantity of feed per oscillation may be predetermined in a manner hereinafter to be described.

The feed tray F is supported from the lower end of links 29 by triangular end plates 33 suitably riveted or otherwise secured to said links, as indicated at 34. As best shown in Figs. 2 and 4, the feed tray itself consists of a shallow dish-like longitudinally extending member, which is longer and somewhat wider than the hopper opening 5 and is provided with up-turned side flanges 35. The central portions of the side flanges 35 are preferably of less height than the end portions thereof, being tapered or inclined downward toward the center as indicated at 35'. As will be seen in Fig. 3, the tray extends beyond the shoulders 7 and beyond the end walls 2 of the hopper to engage the links 29, by means of the plates 33, externally of the hopper and thus all the material which may be deposited through the opening 5 of the hopper will be received in the tray. By the above described tapering arrangement of the central portions of the side flanges 35 it has been found that the discharge of granular material from the sides of the tray when the tray is oscillated is more uniform along the length thereof than would result if the upper edges of these flanges were horizontally straight.

Below the side flanges 35 of the tray there are provided, on each side of the tray and secured thereto, spreading and discharging skirts 36 which extend outwardly and downwardly below and beyond the edges of the tray to direct the thin sheet-like discharge of granular material into the basin B just outside of the vertical plane of the farthest extent of the edges of the bucket C.

Each of said skirts 36 is provided at its ends with upturned flanges 36'.

For oscillating the tray there is provided a pair of depending centrally disposed cam arms 37 which are successively engaged by a cam plate 38 carried by the united central wall of the bucket C. Thus when the bucket is oscillated in clockwise direction the right-hand cam arm 37, as shown in Fig. 1, will be rocked to the right to provide for a counterclockwise oscillation of the tray F in such manner that the tray is jarred and moved slightly to the right and in so moving is slightly tilted with the terminal end of the hooks 30 as its axis. Such jarring and movement of the tray spills out a quantity of the granular solid treatment material, principally at the left side as shown in Fig. 2, which falls down the apron 36 and into the left side of the basin B. Oscillation of the bucket in the opposite direction causes a similar but opposite rocking movement of the feed tray, and thus causes discharge of material principally at the right side of the tray and into the right portion of the basin.

The rocking movements of the bucket C may, if desired, be limited by engagement thereof with the stop members 28. However, I prefer to provide additional stop means such as vertical angle bars 41, secured to the bottom walls 6 of hopper A in position to be forcibly engaged or struck by the outer edges of the respective aprons 36 of the feed tray F and thus arrest the movement of the tray and also of the bucket, just before the bucket would otherwise engage the respective stops 28. This forcible engagement of the feed tray with one of the bars 41 at the end of each movement thereof serves to jar the hopper A and the finely divided, pulverulent or granular solid material contained therein, which overcomes any tendency of such material to "hang up" in any portion of the hopper and provides uniform and complete discharge thereof from the bottom of the hopper.

In operation, a suitable quantity of divided solid treatment material, in granular or pulverulent condition, is placed in the hopper A to form a bed or column of such material as indicated at M in Fig. 2, and water or other liquid is supplied to pipe 18 at a rate sufficient to produce the desired rate of tipping movements of bucket C. A portion of the material passes through the opening 5 at the bottom of the hopper and onto the feed tray F between the side flanges 35, the relative position of said flanges and of the ends of tray F with respect to the sides and ends of the hopper opening 5 being such as to substantially preclude free flow of the material through opening 5 and over the tray when the tray is at rest at either end of its movement, and to provide for discharge of material from the feed tray only upon movement thereof as described above.

Each time the bucket tips to discharge a sheet of liquid into one side of the basin B, it will cause a swinging movement of feed tray F toward that side and thus cause a portion of the material to be discharged from the tray, principally at the opposite side of the tray. The solid material discharged from the opposite side of the tray falls down along and over the outwardly sloping apron 36 and falls therefrom as a relatively thin elongated sheet, as indicated at S in Fig. 2, and is deposited in the form of a thin elongated layer or band on the curved bottom wall 8 of basin B, at the opposite side from the accompanying delivery of liquid and in position to be contacted by and agitated with a similarly delivered sheet of liquid upon the succeeding reverse tipping motion of bucket C.

It will be noted that the water or other liquid, although continuously supplied by a constant flow through the pipe 18, is divided into successive equal portions which are alternately discharged by the bucket to the opposite sides of the mixing basin. An important feature of the invention resides in the fact that the equal alternate discharge of water to the basin is maintained regardless of the rate of flow of the water. Upon increase of water supply the speed of the operation is increased automatically to compensate for such increased flow, but the equal division of the water into predetermined quantities is not varied. Similarly it will be noted that, since the supply of material is determined by the rate of bucket movement, such supply is maintained at a constant ratio with the water flow. However, the proportion of solid material to liquid may be regulated, if desired, by adjusting the wing nuts 32 to vary the vertical spacing of feed tray F relative to the hopper opening 5 and increasing or decreasing the depth of material on the feed tray adjacent the side flanges 35 so that a greater or lesser quantity of material will spill off the feed tray on each lateral movement thereof. Thus it will be seen from Fig. 2 that, in such vertical adjustment of the feed tray, each side flange thereof and the adjacent longitudinal edge of the hopper opening 5 act as a regulating valve to control the rate of feed of solid treatment material in relation to the rate of liquid supply.

The type of agitation employed is also of distinct importance. Just prior to the discharge of water from one side of the bucket a thin elongated strip of treatment material is deposited in the mixing basin B at a point directly in the path of water discharging from the bucket, as the result of a previous tipping of the bucket in the reverse direction. The water splashes from the bucket, being discharged with force by virtue of the inertia due to the bucket oscillation. The water strikes the curved wall 8 of the basin B in the form of a relatively thin elongated sheet, at or closely adjacent the position of the deposited solid material, and surges outward and upward along the bottom and side walls of the basin, carrying at least a portion of the solid material with it, and is prevented from splashing or spilling over the side by the flange means 10 and 11. The water then recedes and surges in the reverse direction, and generally surges back and forth in the basin several times during the progressive gravity outflow thereof through pipe 40. The resulting agitation causes the solid material to become suspended and completely dispersed in the outgoing water. Readily soluble materials will be substantially completely dissolved in the water stream discharged from the apparatus through pipe 40. However, with less soluble materials such as gypsum, a considerable proportion of the solid material is generally carried away in suspension in the water and subsequently introduced into a larger volume of water, such as a stream of irrigation water in a pipe or open ditch, sufficient to completely dissolve the solid material.

Since the water does not contact the solid material until after it is discharged from the hopper by the movements of feed tray F as described above, the material in the hopper remains in dry, free-flowing condition, thus eliminating any difficulties in feeding such as would be encountered with certain materials if the water were permitted to contact the material in the hopper, due to the tendency of such materials to cake or adhere and form a more or less solid mass in the presence of moisture.

The flanges 10 and splash guards 11 at the upper edges of the basin side walls 9 not only prevent loss of water and solid material from the agitation basin, but also prevent the water in the basin from splashing against the feed tray F or the sloping skirts 36, so that all portions of the material feed mechanism are kept dry. Hence the solid material does not contact any wetted surfaces until it falls into the agitation basin, thus eliminating any tendency of the material to adhere to or build up on the feed mechanism due to contact with moisture or with wetted surfaces.

I claim:

1. An apparatus for supplying solid material to liquid comprising, in combination: a solid material hopper having a discharge opening; an agitation basin mounted below the hopper; means for delivering liquid alternately to opposite sides of the basin; and means for delivering individual increments of solid material from said hopper to said basin, comprising a tray located between the opening of the hopper and the basin, means pivotally mounting said tray for oscillating movement relative to said discharge opening to discharge successive increments of solid material from said hopper alternately at opposite sides of the tray, and means connected to said tray and operable by said liquid delivering means to oscillate the tray to deliver such solid material therefrom as successive increments alternately to opposite sides of the basin.

2. An apparatus for supplying solid material to liquid comprising, in combination: a solid material hopper having a discharge opening; an agitation basin mounted below the hopper; means for delivering liquid alternately to opposite sides of the basin; and means for delivering individual increments of solid material from said hopper to said basin, comprising a pivotally mounted tray located between the opening of the hopper and the basin, said tray having side flanges whose central portions are lower than the end portions thereof to provide an even distribution of material discharged therefrom, and means to oscillate the tray to discharge material therefrom as successive increments to opposite sides of the basin.

3. An apparatus for supplying solid material to liquid comprising, in combination: a solid material hopper having a discharge opening; an agitation basin mounted below the hopper; means for delivering liquid to the basin, comprising a pivotally mounted, compartmental bucket for successively delivering successive quantities of liquid alternately to opposite sides of the basin; and means for delivering individual increments of solid material from said hopper to said basin, comprising a tray located between the opening of the hopper and the basin, means pivotally mounting said tray for oscillating movement relative to said discharge opening to discharge successive increments of solid material from said hopper alternately at opposite sides of the tray, and means operable by said bucket to oscillate the tray to deliver such solid material therefrom as successive increments alternately to opposite sides of the basin.

4. In a device of the character described, a feed hopper having a delivery opening, a delivery tray below the opening of the hopper to discharge material therefrom, means pivotally mounting said tray for oscillating movement relative to said opening to discharge successive increments of solid material from said hopper and deliver such increments alternately at opposite sides of the tray, an agitation basin below said tray in position to receive solid material so delivered by the tray, a pipe for delivering liquids, a bucket for receiving liquid from said pipe and movable by said liquid to deliver successive volumes of liquid alternately to opposite sides of said basin, and means operable by said bucket to oscillate said tray.

5. In a device of the character set forth, a vertically disposed material hopper, an open agitation basin disposed below said hopper, a pivotally mounted, adjustable feed tray between said hopper and said basin, a pipe for supplying liquid, a pivotally mounted bucket in said basin for receiving liquid from said pipe and movable by said liquid, and a cam actuated by said bucket for pivotally moving said tray.

6. In a device of the character set forth, a vertically disposed material hopper having an elongated discharge opening, an open agitation basin disposed below said hopper, a pivotally mounted adjustable feed tray beneath the opening of said hopper and above said basin, a pipe for supplying liquid, a pivotally mounted bucket in said basin for receiving liquid from said pipe and movable by said liquid, and means actuated by said bucket for pivotally moving said tray.

7. In a device of the character set forth, a vertically disposed material hopper having an elongated discharge opening, an open agitation basin disposed below sad hopper, a pivotally mounted adjustable feed tray beneath the opening of said hopper and above said basin, a pipe for supplying liquid, a pivotally mounted elongated bucket in said basin for receiving liquid from said pipe and movable by said liquid to discharge elongated successive sheets of liquid to said basin, and means actuated by said bucket for pivotally moving said tray.

8. An apparatus as set forth in claim 7, in which the tray and bucket are constructed and arranged to successively deposit material and liquid respectively to opposite sides of the basin.

EUGENE L. PRIZER.

REFERENCES CITED

The following references are of record in the file of this patent:

UNITED STATES PATENTS

| Number | Name | Date |
| --- | --- | --- |
| 809,585 | Smith | Jan. 9, 1906 |
| 1,422,938 | Dorsey | July 18, 1922 |
| 1,929,693 | Jones et al. | Oct. 10, 1933 |